F. TUREK.
FILTER SYSTEM.
APPLICATION FILED DEC. 17, 1909.
975,483.
Patented Nov. 15, 1910.
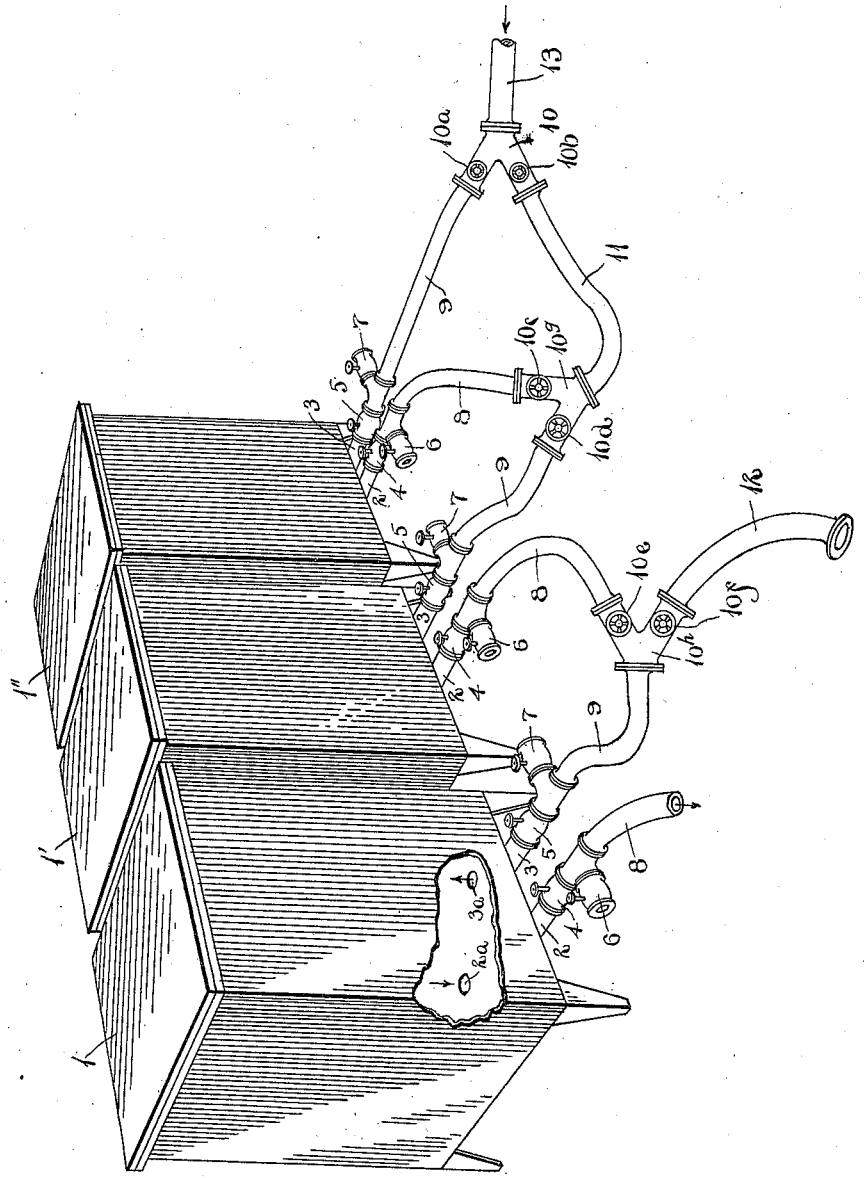
Witnesses:
Monroe E. Miller
Edward M. Wise
Ferdinand Turek, Inventor,
By Bommhardt & Co.
Attorneys.

UNITED STATES PATENT OFFICE.

FERDINAND TUREK, OF CLEVELAND, OHIO.

FILTER SYSTEM.

975,483.  Specification of Letters Patent. Patented Nov. 15, 1910.

Application filed December 17, 1909. Serial No. 533,525.

*To all whom it may concern:*

Be it known that I, FERDINAND TUREK, a citizen of the United States, residing at Cleveland, in the county of Cuyahoga and State of Ohio, have invented certain new and useful Improvements in Filter Systems, of which the following is a specification.

This invention relates to filters, and has for its object to provide an improved multiple filter system, comprising a series of filter units or sections, with means to connect the same in series or otherwise, whereby the beer or other liquid to be filtered can be flowed from one section to the other. The arrangement also enables one or more units to be cut out of the system, for the purpose of cleaning said unit, or for other purposes. The arrangement is such that the liquid to be filtered, or a cleaning agent may be forced through the section, or through any individual section, in either direction.

Further uses and advantages of the invention will be apparent from the following description.

The accompanying drawing forming a part of this application is a perspective view, partly broken away, of three filter units with connections. Each unit will be provided with suitable filtering devices which are not shown and which need not be described, but which may be any apparatus suitable for the purpose, such for example as that disclosed in my pending application No. 515,916.

The casings of the filter units are indicated at 1, 1' and 1'' respectively, and they are preferably arranged in a row or otherwise convenient for the pipe connections. The inlet pipe to each section is indicated at 3, opening through the bottom of the casing as at $3^a$, and the outlet pipe of each section is indicated at 2. Each inlet pipe has a valve 5, and each outlet pipe a valve 4. Each pipe 5 is provided with a branch with a valve 7 therein, and each outlet pipe with a branch having a valve 6 therein, these branches being used for the purpose of conducting a cleaning fluid such as hot water or steam when the filters are to be cleaned. Pipes 9 lead to the respective inlet pipes 3, and pipes 8 lead from the respective outlet pipes 2.

The main supply pipe for the beer or fluid to be filtered is indicated at 13, and it is connected by a Y 10 to the inlet pipe 9 of the unit 1'', which in the arrangement shown is the first filter of the series. The branch of the Y leading to the pipe 9 has a valve $10^a$. The other branch has a valve $10^b$, and is connected by a hose 11 to another Y $10^g$ one branch of which is connected to the outlet pipe 8 of the first filter, and has a valve $10^c$. The other branch of the Y $10^g$ connects to the inlet hose 9 of the second filter in the series, and has a valve $10^d$. The outlet hose 8 of the second filter is connected to one branch of a Y $10^h$, the said branch having a valve $10^e$, and the Y being connected to the inlet hose 9 of the third unit in the series. The other branch of the Y $10^h$ is connected to a hose 12, and has a valve $10^f$. In ordinary operation the valve $10^b$, and the valve $10^f$, will be closed, and the other valves opened. The beer or liquid to be filtered is forced through the pipe 13 and flows thence through the hose 9 into and through the first filter 1'', then out through the pipe 8 and through the hose 9 of the next filter, and thence through corresponding pipes of the third filter from which it is finally discharged through the last pipe 8. Obviously the direction of flow can be reversed.

Each filter section can be cleaned by fluid admitted through either of the branches containing the valves 6 and 7. Thus to clean the middle section 1' the valves $10^d$ and $10^e$ are closed, the hose 11 is detached from the Y $10^g$ and the hose 12 is attached in its place. The flow of beer will then be through the first unit 1'', Y $10^g$, pipe 12, Y $10^h$, and thence to the third unit 1. Meanwhile the valves 6 and 7 of the second unit 1' being opened, cleaning fluid can be forced in either direction through the same, the closed valves $10^d$ and $10^e$ preventing flow of said fluid into other parts of the system.

The first section 1'' may be cut out by closing the valves $10^a$ and $10^c$ and opening the valve $10^b$, permitting flow through the pipe 11, to the second unit and thence to the third unit. Various other arrangements are possible, to permit flow of the cleaning fluid either through the whole system or through one or more of the units thereof.

The connections and direction of flow of the fluid to be filtered will be so arranged as to provide the best operation. By providing means whereby one or more units can be cut out while being cleaned, a greater pressure may be used than the ordinary filter pressure. One section after another may be taken and cleaned, the remaining sections of the filter remaining in operation. By providing a system with a series of sections the filtration may be effected without undue pressure on any part of the material in the sections, and the operation does not have to be continued for the purpose of cleaning, as with single longitudinal or other filters of large capacity. At the same time the beer will pass through a sufficient amount of filtering material to extract all the impurities. The apparatus also has other advantages which will be apparent to those skilled in the art and which are omitted as unnecessary to a disclosure of the construction.

What I claim as new is:—

A filter system consisting of a series of filter units each having inlet and outlet pipes provided respectively with valved supply and discharge branches for a cleaning fluid, a supply pipe, a valved Y between the supply pipe and the inlet pipe of the first unit, valved Y's connecting the outlet pipe of one unit to the inlet pipe of another, and a movable by-pass pipe arranged for connection between the various Y's, to pass the fluid to be filtered around any desired unit.

In testimony whereof, I do hereby affix my signature in the presence of two witnesses.

FERDINAND TUREK.

Witnesses:
STEDMAN J. ROCKWELL,
MONROE E. MILLER.